US012574731B2

(12) United States Patent (10) Patent No.: US 12,574,731 B2
Fenichel et al. (45) Date of Patent: Mar. 10, 2026

(54) SYSTEMS AND METHODS FOR LOCATION BASED VIRTUAL CERTIFICATION NUMBER USE

(71) Applicant: Capital One Services, LLC, McLean, VA (US)

(72) Inventors: Allison Fenichel, Brooklyn, NY (US); Amanda Sneider, New York, NY (US)

(73) Assignee: Capital One Services, LLC, McLean, VA (US)

( * ) Notice: Subject to any disclaimer, the term of this patent is extended or adjusted under 35 U.S.C. 154(b) by 322 days.

(21) Appl. No.: 18/343,030

(22) Filed: Jun. 28, 2023

(65) Prior Publication Data

US 2025/0008327 A1 Jan. 2, 2025

(51) Int. Cl.
H04W 12/069 (2021.01)
H04W 12/61 (2021.01)
H04W 12/63 (2021.01)

(52) U.S. Cl.
CPC ......... H04W 12/069 (2021.01); H04W 12/61 (2021.01); H04W 12/63 (2021.01)

(58) Field of Classification Search
CPC ... H04W 12/069; H04W 12/61; H04W 12/63; G06Q 20/3224; G06Q 20/4015; G06Q 20/385
See application file for complete search history.

(56) References Cited

U.S. PATENT DOCUMENTS

| | | | |
|---|---|---|---|
| 2013/0275303 A1 | 10/2013 | Fiore et al. | |
| 2017/0270528 A1* | 9/2017 | Prakash | G06Q 20/3224 |
| 2020/0327538 A1 | 10/2020 | Shrivastava | |
| 2021/0125164 A1* | 4/2021 | Mehrhoff | G06Q 20/341 |
| 2021/0258320 A1* | 8/2021 | Butler | H04L 63/102 |
| 2022/0084009 A1 | 3/2022 | Sarin | |
| 2022/0300968 A1* | 9/2022 | Davenport | G06Q 20/16 |
| 2023/0140712 A1* | 5/2023 | Sneider | G06Q 20/12 |
| | | | 705/41 |

* cited by examiner

*Primary Examiner* — Kabir A Timory
(74) *Attorney, Agent, or Firm* — Bookoff McAndrews, PLLC

(57) ABSTRACT

Systems and methods include secure virtual certification number (VCN) use, and include receiving a VCN generation request comprising a primary account number (PAN) and a location identifier, generating a VCN based on the PAN, the VCN being associated with a geographical location corresponding to the location identifier, receiving a VCN use request from an external entity, the VCN use request comprising the VCN, receiving a use location data associated with the VCN use request, comparing the use location data to the geographical location associated with the VCN, and providing one of a VCN use authorization or a VCN use denial based on comparing the use location data to the geographical location.

20 Claims, 6 Drawing Sheets

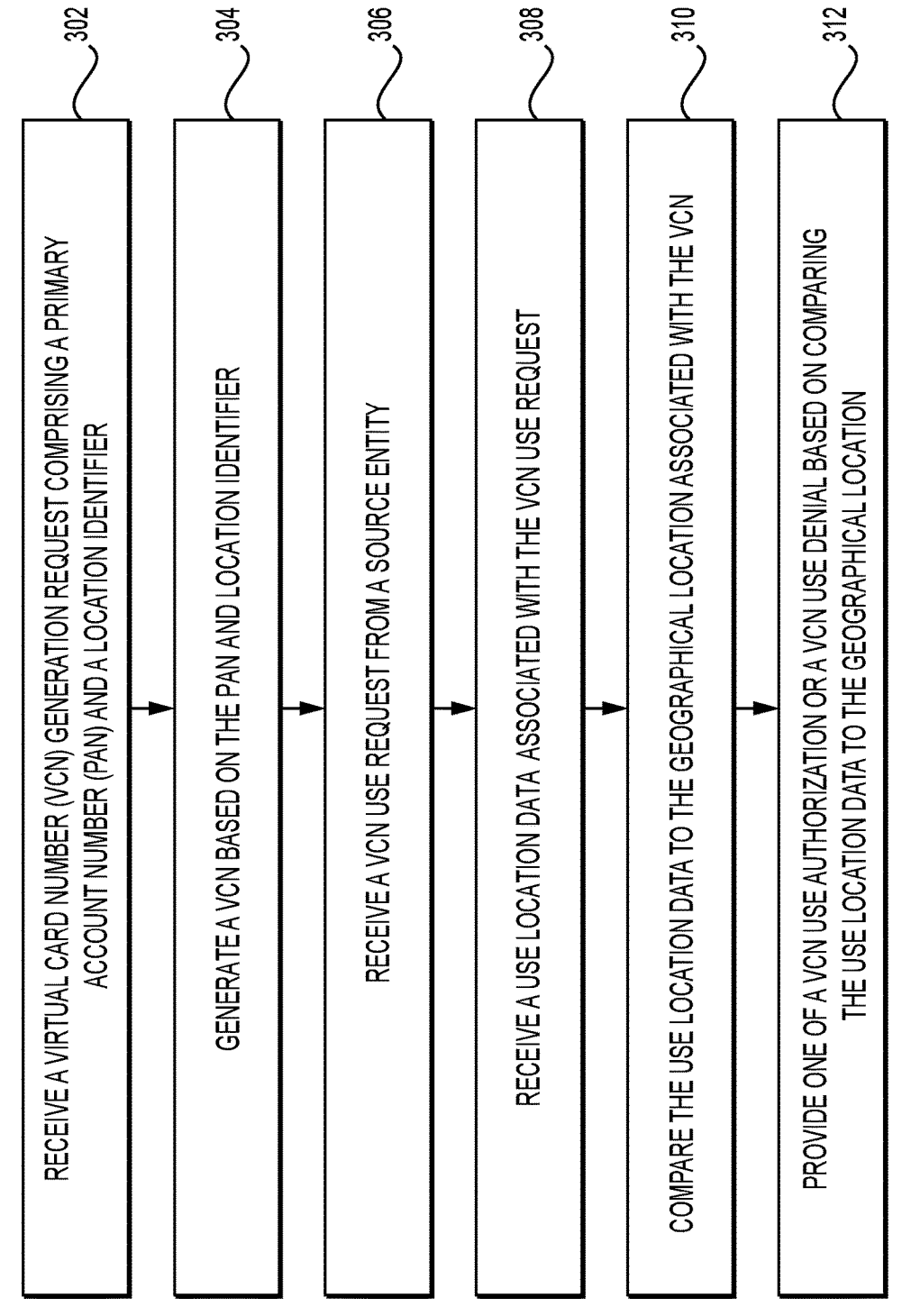

300

302 — RECEIVE A VIRTUAL CARD NUMBER (VCN) GENERATION REQUEST COMPRISING A PRIMARY ACCOUNT NUMBER (PAN) AND A LOCATION IDENTIFIER

304 — GENERATE A VCN BASED ON THE PAN AND LOCATION IDENTIFIER

306 — RECEIVE A VCN USE REQUEST FROM A SOURCE ENTITY

308 — RECEIVE A USE LOCATION DATA ASSOCIATED WITH THE VCN USE REQUEST

310 — COMPARE THE USE LOCATION DATA TO THE GEOGRAPHICAL LOCATION ASSOCIATED WITH THE VCN

312 — PROVIDE ONE OF A VCN USE AUTHORIZATION OR A VCN USE DENIAL BASED ON COMPARING THE USE LOCATION DATA TO THE GEOGRAPHICAL LOCATION

*FIG. 3*

SYSTEMS AND METHODS FOR LOCATION BASED VIRTUAL CERTIFICATION NUMBER USE

TECHNICAL FIELD

Various embodiments of the present disclosure relate generally to use of a virtual certification number (VCN), and more particularly, to systems and methods for generating one or more location specific VCNs and/or authorizing transactions based on location specific VCNs.

BACKGROUND

Users often use one or more certification sources (e.g., payment mechanisms) such as credit cards, debit cards, or the like, to complete transactions, such as online transactions. There has been an increase in fraud, spam, and/or theft related to certification sources. Such fraud, spam, and/or theft is often related to a fraudulent party obtaining access to certification sources (e.g., credit card numbers, payment mechanisms, or parts thereof). Such access is often obtained as a result of a user using a certification source where the fraudulent party can capture and/or use information associated with the certification source.

The present disclosure is directed to addressing one or more of the above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for virtual certification number (VCN) generation and use.

According to an aspect, a method for secure virtual certification number (VCN) use includes receiving a VCN generation request comprising a primary account number (PAN) and a location identifier; generating a VCN based on the PAN, the VCN being associated with a geographical location corresponding to the location identifier; receiving a VCN use request from an external entity, the VCN use request comprising the VCN; receiving a use location data associated with the VCN use request; comparing the use location data to the geographical location associated with the VCN; and providing one of a VCN use authorization or a VCN use denial based on comparing the use location data to the geographical location.

According to another aspect, a method for secure virtual certification number (VCN) use includes, receiving a VCN use request from an external entity, the VCN use request comprising a VCN generated based on a primary account number (PAN) and associated with a geographical location; receiving a use location data associated with the VCN use request; comparing the use location data to the geographical location associated with the VCN; and providing one of a VCN use authorization or a VCN use denial based on comparing the use location data to the geographical location.

According to another aspect, a method for secure virtual certification number (VCN) use includes receiving, at an external device, an indication to initiate a VCN based transaction with an external entity; providing a VCN in response to receiving the indication, the VCN generated based on a VCN generation request comprising a PAN and a location identifier associated with a geographical location; providing a use location data based on sensor data from a sensor of the external device; and receiving one of a VCN use authorization or a VCN use denial, in response to providing the VCN and the use location data.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 3 depicts a flowchart for determining VCN authorizations, according to one or more embodiments.

DETAILED DESCRIPTION OF EMBODIMENTS

Figure 1:
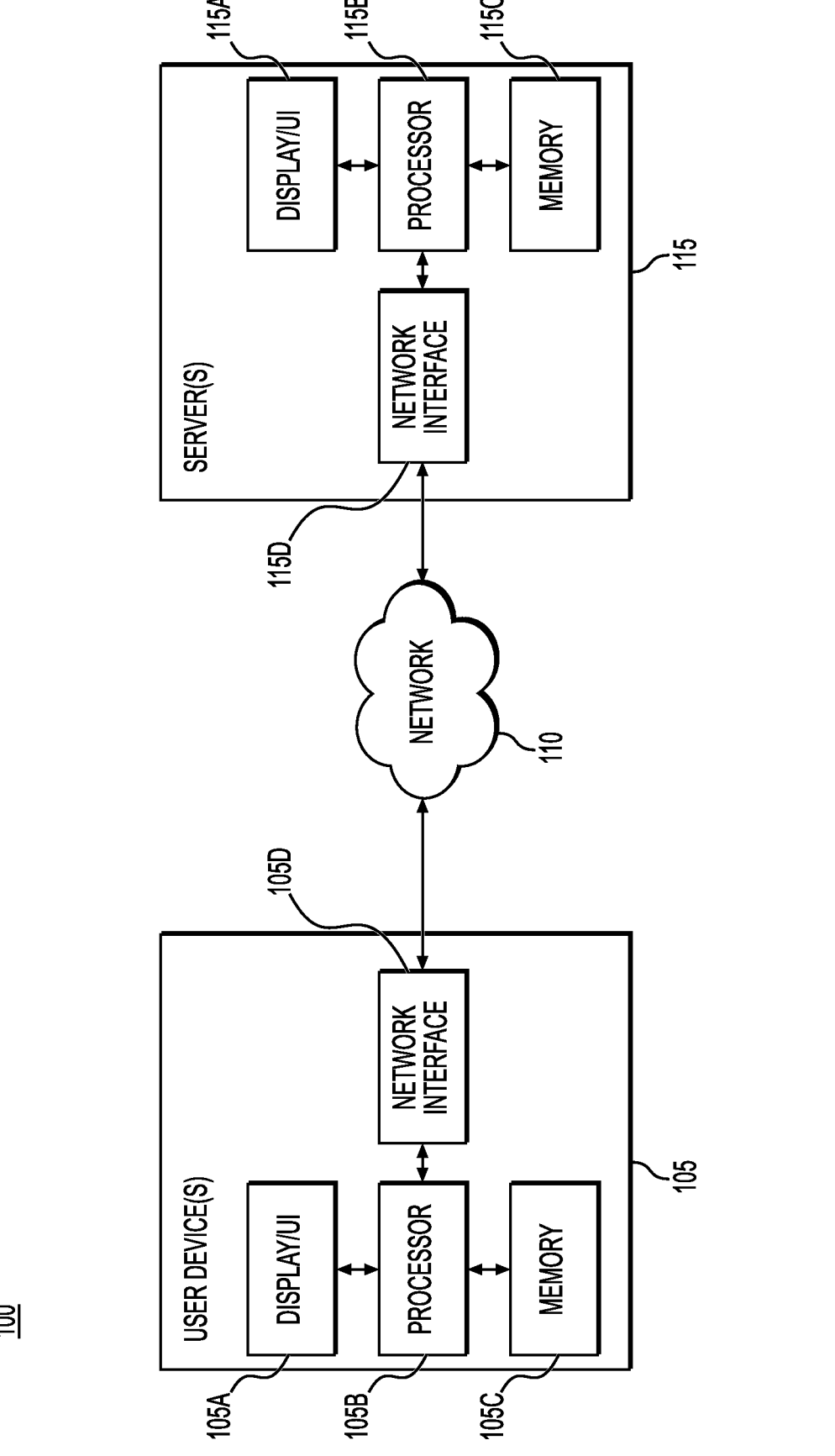
FIG. 1 depicts an exemplary setting for virtual certification number (VCN) implementation, according to one or more embodiments.

According to certain aspects of the disclosure, systems and methods are disclosed for use of a virtual certification number (VCN) (e.g., a virtual card number), and more particularly, to systems and methods for generating one or more location specific VCNs and/or authorizing transactions based on location specific VCNs.

The techniques disclosed herein provide technical benefits including automated secure access to one or more certification mechanisms (e.g., payment mechanisms such as credit cards, debit cards, charge cards, credit accounts, debit accounts, etc.) without transmitting certification mechanism credentials (e.g., primary account number(s) (PANs)), automated security verification, risk-based registration, and secure checkouts. Technical effects of the techniques disclosed herein include securely generating VCNs based on corresponding PANs that pair with specific locations or events, modifying one or more databases based on VCN generation, automatically authenticating VCNs based on location mapping and risk factors, and denying unauthorized use of VCNs. As disclosed herein, VCNs may be generated by tokenizing and/or encrypting a PAN, associating a location or an event with the VCNs, retrieving account identifiers based on the tokenized and/or encrypted PAN, generating reference identifiers, and conducting a risk analysis. A user may trigger VCN generation via a secure account (e.g., a user account, an account associated with a PAN, a financial account, an event based account, etc.) portal, where the trigger results in one or more of a location association process, a PAN association process, and/or the like. A generated VCN may be used for transaction authentication based on location verification, as discussed herein. Accordingly, a technical effect of generating and/or using a VCN includes securely using a PAN without the PAN being provided by the user and/or being received by a source. This technical effect has an effect on a transaction process of securely authorizing transactions without risk of PAN distribution to fraudulent parties.

The technical effects provided by the techniques disclosed herein include evoking and updating database structures to generate and/or use VCNs. Such database structures are traditionally configured to store and/or access PANs, resulting in a security risk. However, techniques provided herein can be used to implement VCN-based authentication by evoking and/or updating database structures to authorize transactions without PANs (e.g., on a location basis). For example, associating a location for VCN use provides security effects by limiting use of the VCN and further adds security controls based on automated rejection of VCN use external to the associated location. Accordingly, both the access to such database structures and the information stored and/or accessed using such database structures require the database structures to operate in a new way.

As disclosed herein, secure access to one or more payment mechanisms may be provided by registering a user account and a PAN associated with the user account for VCN use for a specific location or event. The registration and/or use of VCNs may be implemented via one or more of an external gateway, a registration serverless function (e.g., a registration lambda function), an authorization serverless function (e.g., an authorization lambda function), a dynamic database, a token service, a VCN service provider, and/or a risk module.

VCNs, as used herein, provide a secure way to transact with sources using source portals (e.g., source point-of-sale devices, source websites, source applications, source extensions, etc.). Such secure transactions may be facilitated by using VCNs without disclosure, transmission, and/or use of PANs that can be otherwise used by a fraudulent entity. A VCN may be linked to a PAN and/or a user account as well as a given location (e.g., an event based location), such that a given VCN may be authorized for use based on the given location, mitigating the risk of a fraudulent entity using a user's PAN at any other location. Accordingly, techniques disclosed herein add one or more layers of protection when using certification mechanisms.

VCNs generated in accordance with the techniques disclosed herein may be generated specifically for a given location. A VCN generated in accordance with the techniques disclosed herein may be immutably associated with a given location such that the association between the VCN and the given location may not be modified by user or entity action. Such immutability may provide a layer of security currently not available to users.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially," "approximately," and "generally," are used to indicate a possible variation of ±10% of a stated or understood value.

Terms like "source," "provider," "merchant," "vendor," or the like generally encompass an entity or person involved in providing, selling, and/or renting items to persons such as a seller, dealer, renter, merchant, vendor, or the like, as well as an agent or intermediary of such an entity or person. An "item" generally encompasses a good, service, or the like having ownership or other rights that may be transferred. As used herein, terms like "user" or "customer" generally encompasses any person or entity that may desire information, resolution of an issue, purchase of a product, or engage in any other type of interaction with a provider. The term "browser" or "extension" may be used interchangeably with other terms like "program," "electronic application," or the like, and generally encompasses software that is configured to interact with, modify, override, supplement, or operate in conjunction with other software.

As used herein, a "machine learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine learning model may operate on an input linearly, in parallel, via a network (e.g., a neural network), or via any suitable configuration.

The execution of the machine learning model may include deployment of one or more machine learning techniques, such as linear regression, logistic regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

While several of the examples herein involve certain types of machine learning, it should be understood that techniques according to this disclosure may be adapted to any suitable type of machine learning. It should also be understood that the examples above are illustrative only. The techniques and technologies of this disclosure may be adapted to any suitable activity.

A secure account may be any account that is associated with a secure entity and one or more users and includes information about the one or more users. For example, a secure account may be an account associated with a certification mechanism (e.g., payment mechanisms such as credit cards, debit cards, charge cards, credit accounts, debit accounts, etc.). A secure account may be accessed using credentials such as, for example, login credentials, biometric credentials, or the like. As further disclosed herein, features associated with a secure account may be accessed using an external account.

An external entity may be or may include a user-facing entity such that a user may interact with an external entity interface. An external entity interface may be a web browser, an extension (e.g., a browser extension), a website, an operating system, an application, or the like. For example, an external entity may be an event entity such as an event coordinator, event organizer, event access provider, and/or the like. A user may transact with one or more sources (e.g., merchants, brands, organizations, marketplaces, etc.) using an external device, as further disclosed herein. Such transactions may take place at a given location (e.g., a location associated with a given event). The external entity may communicate with a secure entity via an external gateway. The secure entity may be an entity that hosts, controls, and/or has access to a secure account.

A user may register use of a VCN at a secure entity, by requesting the registration of the use via the secure entity or via the external entity. For example, a user may register use of a VCN using a secure entity portal after accessing a secure account via the secure entity portal. The user may access the secure account using credentials such as, for example, login credentials, biometric credentials, or the like.

A user may register use of a VCN using an external entity portal configured to receive VCN registration requests. Alternatively, the user may register use of a VCN via a source portal (e.g., a source website, a source application, a source application programming interface (API), etc.) accessed using an external entity platform (e.g., an external entity browser, an external entity application, an external entity operating system, an external entity API, etc.). For example, the user may direct an interface (e.g., an application, browser, etc.) to a source website using an external entity browser. As another example, a user may direct to a source application using an external entity operating system.

According to implementations of the disclosed subject matter, a user may trigger a registration request for registering use of a VCN associated with a PAN associated with the user. The user may provide the PAN via an external entity portal or via a source portal. The user may further provide location information (e.g., geographical location) for a target location to be associated with the VCN. The location information may be provided as or may be converted into a location identifier. The location identifier may be an address, a coordinate, a geographical region, or the like. Alternatively, the location information may be provided as event information (e.g., an event name, a venue, an event type, etc.). The event information may be converted into a location identifier, as further discussed herein.

According to implementations of the disclosed subject matter, a location area may be determined. The location area may be, for example, an area, a radius, a diameter, a proximity, a distance, or the like or a combination thereof. The location area may be provided by a user (e.g., via user input) or may be determined automatically (e.g., by the secure entity), as further discussed herein.

According to implementations of the disclosed subject matter, a time value may be associated with the VCN. The time value may correspond to one or more times (e.g., one or more ranges of time) associated with use of the VCN. As further discussed herein, VCN use may be authorized based on the time value. The time value may be provided by a user or may be determined automatically (e.g., by the secure entity), as further discussed herein.

According to implementations of the disclosed subject matter, one or more rules may be associated with the VCN. The one or more rules may correspond to one or more actions, properties, or characteristics associated with use of the VCN (e.g., location, one or more parties with whom a VCN may be provided or used, transaction type, transaction volume, a numeric amount, and the like). As further discussed herein, VCN use may be authorized based on the one or more rules. The one or more rules may be provided by a user or may be determined automatically (e.g., by the secure entity), as further discussed herein.

A location based VCN may be generated based on the location identifier and may further be generated based on one or more of the time value and/or the one or more rules. The location based VCN may be provided to the user and/or may be associated with a user account (e.g., the secure account).

According to implementations of the disclosed subject matter, a VCN use request based on a location based VCN may be received. The VCN use request may include location data. The location data may be authenticated (e.g., by the secure entity) that receives the VCN use request. The VCN use request may include the VCN, the location data, and/or transaction data associated with the VCN use request. For example, the VCN may be provided from a source (e.g., a merchant) to a VCN use authenticating entity (e.g., the secure account). The source may initiate a transaction at a source portal (e.g., for a purchase of a good, a purchase of a service, a subscription, etc.). Transaction data may be generated based on the initiation of the transaction at the source portal. The transaction data may be generated by the source, a transaction processor (e.g., a certification mechanism network, a financial institution, etc.), or the like, or a combination thereof. The transaction data may include transaction identifiers, encrypted data, or the like and may be or may include a hash value.

The location data associated with the VCN use request may be compared to the location identifier to determine an overlap, a match, or an association. If the comparison results in a confirmation that the location data maps to the location identifier, then the VCN use may be authorized with respect to the location data. The approved authorization may indicate that the location data provided in the VCN use request is associated with the location identifier. Additionally, a timestamp associated with the VCN use request may be compared to the time value to determine an overlap, a match, or an association. If the comparison results in a confirmation that the timestamp maps to the time value, then the VCN use may be authorized with respect to the location data. Additionally, one or more rule properties associated with the VCN use request may be compared to the one or more rules to determine an overlap, a match, or an association. If the comparison results in a confirmation that the rule properties map to the one or more rules, then the VCN use may be authorized with respect to the one or more rules. A VCN use authorization may be generated based on one or more of the location, time, and/or rule based authorizations. Alternatively, a VCN use denial may be generated based on the lack of one or more of the location, time, and/or rule based authorizations.

FIG. 1 depicts an exemplary setting 100 which may be used with the techniques presented herein. The setting 100 may include one or more user device(s) 105 (hereinafter "user device 105" for ease of reference), a network 110, one or more server(s) 115 (hereinafter "server 115" for ease of reference). While only one of each of user device 105 and server 115 are depicted, the disclosure is not limited to one of each and two or more of each of user device 105 and server 115 may be implemented in accordance with the techniques disclosed herein.

User device 105 may be used to, for example, access a secure account or portal, access an external entity account, portal, or platform, access a source portal, or the like. User device 105 may be used to trigger a VCN generation, to initiate a transaction at a source, or the like. Server 115 may be a secure entity server (e.g., may host a secure account, a secure entity system, etc.), an external entity server (e.g., may host an external account, an external entity system, etc.), a source server (e.g., a brand server), or the like.

The user device 105 and the server 115 may be connected via the network 110, using one or more standard communication protocols. The network 110 may be one or a combination of the Internet, a local network, a private network, or other network. The user device 105 and the server 115 may transmit and receive messages from each other across the network 110, as discussed in more detail below.

The server 115 may include a display/UI 115A, a processor 115B, a memory 115C, and/or a network interface 115D. The server 115 may be a computer, system of computers (e.g., rack server(s)), or a cloud service computer system. The server 115 may execute, by the processor 115B, an operating system (O/S). The memory 115C may also store one or more instances of a machine learning model (e.g. an authentication machine learning model, etc.), instructions to perform operations, or the like. The display/UI 115A may be a touch screen or a display with other input systems (e.g., mouse, keyboard, etc.) for an operator of the server 115 to control the functions of the server 115. The network interface 115D may be a TCP/IP network interface for, e.g., Ethernet or wireless communications with the network 110.

User device 105 may include a display/UI 115A, a processor 105B, a memory 105C, and/or a network interface 105D. User device 105 may be an electronic and/or mobile device, such as a cell phone, a tablet, a laptop, a computer, a wearable device, a terminal, etc. User device 105 may execute, by the processor 105B, an operating system (O/S), a machine learning training component, a portal, a platform, or the like. One or more components shown in FIG. 1 may generate or may cause to be generated one or more graphic user interfaces (GUIs) based on instructions/information stored in memory 105C, instructions/information received from server 115, and/or one or more user devices 105. The GUIs may be portal interfaces, platform interfaces, mobile application interfaces, for example.

In various embodiments, the network 110 may be a wide area network ("WAN"), a local area network ("LAN"), personal area network, or the like. In some embodiments, electronic network 110 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like.

As discussed in further detail below, the one or more components of exemplary setting 100 may one or more of generate, store, train, or use a machine learning model or its applicable components or attributes such as nodes, model states, weights, layers, biases, or the like. The exemplary setting 100 or one of its components may include a machine learning model and/or instructions associated with the machine learning model, e.g., instructions for generating a machine learning model, training the machine learning model, using the machine learning model, etc. The exemplary setting 100 or one of its components may include instructions for retrieving data, adjusting data, e.g., based on the output of the machine learning model, and/or operating a display to output data, e.g., as adjusted based on the machine learning model. The exemplary setting 100 or one of its components may include, provide, and/or generate training data.

In some embodiments, a system or device other than the components shown in exemplary setting 100 may be used to generate and/or train the machine learning model. For example, such a system may include instructions for generating the machine learning model, the training data and ground truth, and/or instructions for training the machine learning model. A resulting trained machine learning model may then be provided to exemplary setting 100 or one of its components. The machine learning model may be stored in any applicable location such as in memory 115C or memory 105C, in a location other than setting 100 in operable communication with setting 100, or the like.

Generally, a machine learning model includes a set of variables, e.g., nodes, neurons, filters, etc., that are tuned, e.g., weighted or biased, to different values via the application of training data. In supervised learning, e.g., where a ground truth is known for the training data provided, training may proceed by feeding a sample of training data into a model with variables set at initialized values, e.g., at random, based on Gaussian noise, a pre-trained model, or the like. The output may be compared with the ground truth to determine an error, which may then be back-propagated through the model to adjust the values of the variable. Alternatively or in addition, unsupervised learning and/or semi-supervised learning may be used to train a machine learning model.

Training may be conducted in any suitable manner, e.g., in batches, and may include any suitable training methodology, e.g., stochastic or non-stochastic gradient descent, gradient boosting, random forest, etc. In some embodiments, a portion of the training data may be withheld during training and/or used to validate the trained machine learning model, e.g., compare the output of the trained model with the ground truth for that portion of the training data to evaluate an accuracy of the trained model. The training of the machine learning model may be configured to cause the machine learning model to learn associations between training data (e.g., secure user data) and ground truth data, such that the trained machine learning model is configured to determine an output in response to the input data based on the learned associations.

In various embodiments, the variables of a machine learning model may be interrelated in any suitable arrangement in order to generate the output. For example, in some embodiments, the machine learning model may include image-processing architecture that is configured to identify, isolate, and/or extract features, geometry, and/or structure. For example, the machine learning model may include one or more convolutional neural networks ("CNN") configured to identify features in the data, and may include further architecture, e.g., a connected layer, neural network, etc., configured to determine a relationship between the identified features in order to determine a location in the data.

In some instances, different samples of training data and/or input data may not be independent. Thus, in some embodiments, the machine learning model may be configured to account for and/or determine relationships between multiple samples.

For example, in some embodiments, the machine learning models referenced herein may include a CNN, or Recurrent Neural Network ("RNN"). Generally, RNNs are a class of feed-forward neural networks that may be well adapted to processing a sequence of inputs. In some embodiments, the machine learning model may include a Long Short Term Memory ("LSTM") model and/or Sequence to Sequence ("Seq2Seq") model. An LSTM model may be configured to generate an output from a sample that takes at least some previous samples and/or outputs into account. A Seq2Seq model may be configured to, for example, receive a sequence of items (e.g., words, letters, time series, images) as input, and generate another sequence items (e.g., where they may convert sequences of one domain to sequences of another domain). For example, a Seq2Seq model may, for example, be configured to receive image data and output location data associated with the received image data (e.g., a location where an image was captured).

Although depicted as separate components in FIG. 1, it should be understood that a component or portion of a component in the exemplary setting 100 may, in some embodiments, be integrated with or incorporated into one or more other components. For example, a portion of the display/UI 115A may be integrated into the user device 105 or the like. In another example, the server 115 may be integrated in a data storage system. In some embodiments, operations or aspects of one or more of the components discussed above may be distributed amongst one or more other components. Any suitable arrangement and/or integration of the various systems and devices of the exemplary setting 100 may be used.

Further aspects of the machine learning model and/or how it may be utilized to authorize an external account, generate certainty scores, etc. are described herein. In the following methods, various acts may be performed or executed by a component from FIG. 1, such as the server 115, the user device 105, or components thereof. However, it should be understood that in various embodiments, various components of the exemplary setting 100 discussed above may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

Figure 2:
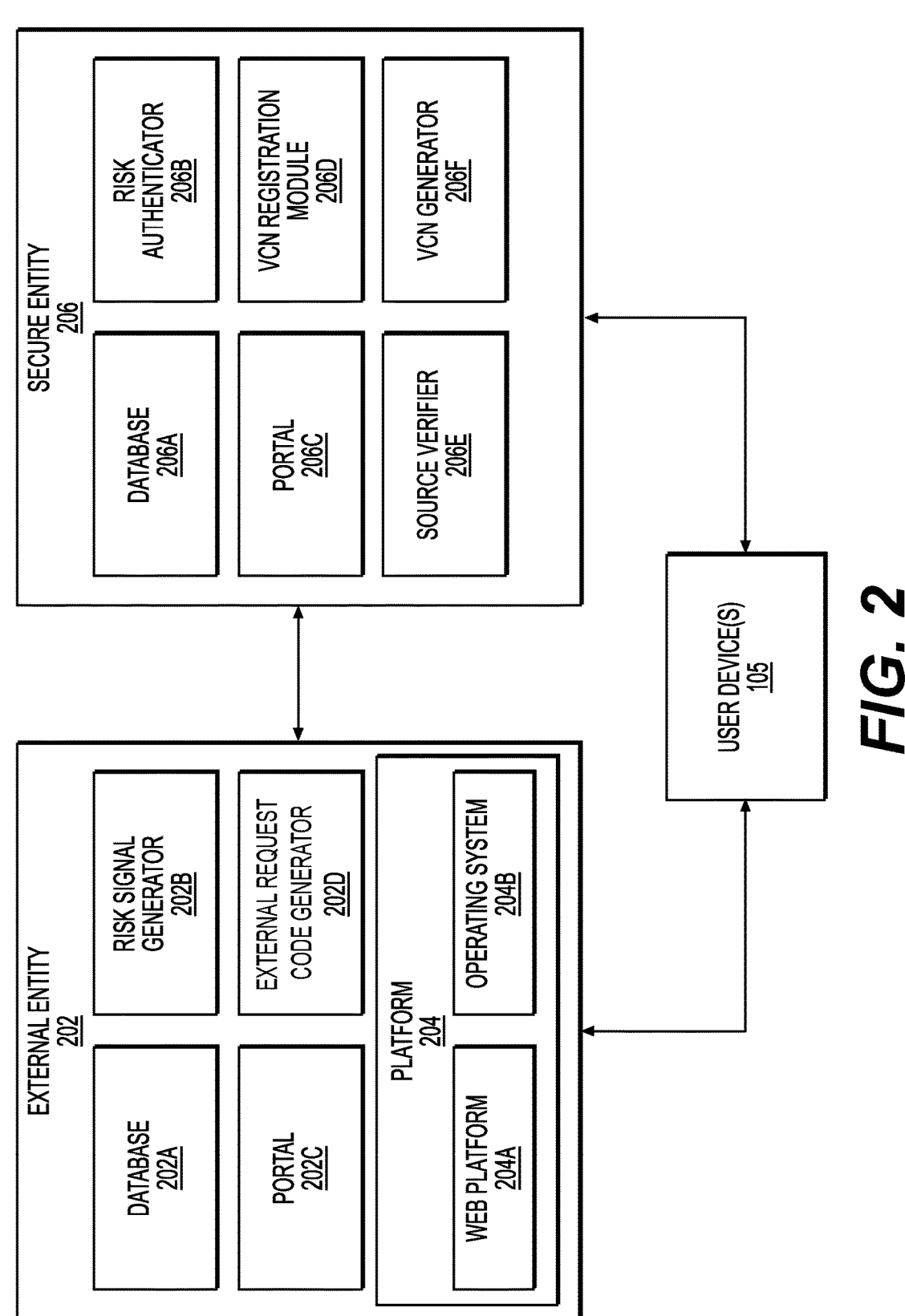
FIG. 2 depicts an environment for VCN implementation, according to one or more embodiments.

FIG. 2 depicts an exemplary environment 200 which may be used with the systems and techniques presented herein. External entity 202 may include, provide, communicate with, or be associated with an external entity database 202A, risk signal generator 202B, external entity portal 202C, external request code generator 202D, and/or platform 204 which may include web platform 204A and/or operating system 204B. It will be understood that external entity 202 may include more or less components than those shown in exemplary environment 200.

Secure entity 206 may include, provide, communicate with, or be associated with a secure entity database 206A, a risk authenticator 206B, a portal 206C, a VCN registration module 206D, a source verifier 206E, and/or a VCN generator 206F. It will be understood that external entity 202 may include more or less components than those shown in exemplary environment 200.

User device 105, as shown in FIG. 1, may communicate with external entity 202 and/or secure entity 206. External entity 202 may communicate with user device 105 and/or secure entity 206. Secure entity 206 may communicate with user device 105 and/or external entity 202. The communication referenced herein may be implemented in accordance with the communication discussed in reference to FIG. 1 (e.g., via network 110, via wired communication, etc.). One or more components shown in system environment 200 and/or any components associated with external entity 202, secure entity 206, and/or user device 105 may use, may include, or may be implemented using a remote or cloud component such as a cloud server, cloud database, or the like. Components of system setting 100 are further referenced herein.

According to implementations of the disclosed subject matter, a user may register for VCN use via an external entity 202 external entity portal 202C. The external entity 202 (e.g., an entity authorized to request registration of VCN use) may communicate with secure entity 206 to register VCN use. The external entity 202 may register VCN use based on data stored in database 202A, based on risk analysis conducted using risk signal generator 202B, an external request code generator 202D, and/or the like. For example, a user may trigger VCN registration via an external entity web platform 204 (e.g., a website, a browser, etc.) or external entity 202 operating system 204B (e.g., a mobile operating system). External entity 202 may initiate VCN registration via transmitting external code generated at external request code generator 202D. The external code may be provided to secure entity 206 (e.g., an entity authorized to approve VCN registration). The external code may be used to register a user's user account (e.g., an external entity account and/or secure entity account) for VCN use. Secure entity 206 VCN registration module 206D may authorize the VCN registration (e.g., based on a secure entity 206 risk analysis at risk authenticator 206B) for a PAN associated with the user. Secure entity 206 may transmit the VCN registration to external entity 202. A registration authentication may be generated confirming VCN registration for VCN use.

According to implementations of the disclosed subject matter, a user may register for VCN use via source entity 206 secure entity portal 206C. The secure entity 206 (e.g., an entity authorized to register VCN use) may register VCN use based on data stored in database 206A, based on risk analysis conducted using risk signal generator 202B, an external request code generator 202D, and/or the like. For example, a user may access a secure user account associated with secure entity 202. The user may provide credentials to log into or otherwise access the secure user account via a secure entity portal 206C (e.g., via a webpage, an application, etc.). Secure entity 206 VCN registration module 206D may authorize the VCN registration (e.g., based on a secure entity 206 risk analysis at risk authenticator 206B). Secure entity 206 may designate a given PAN associated with the user as registered for VCN use. A registration authentication may be generated confirming VCN registration for VCN use.

According to implementations of the disclosed subject matter, location-based VCNs may be generated once a registration authentication for PAN has been generated. The registration authentication may designate the PAN as a PAN approved for VCN use, as disclosed herein. VCNs may provide a secure way to transact with sources (e.g., brands, companies, sellers, marketplaces, etc.) using source portals (e.g., source point of sale source devices). Such secure transactions are facilitated by using VCNs without disclosure, transmission, and/or use of PANs to or by a source, such that the likelihood of a fraudulent entity obtaining the PAN is eliminated or severely mitigated. A VCN may be linked to a PAN and/or a user account as well as a given source, such that a given VCN may be authenticated for use for a given source, mitigating the risk of a fraudulent entity obtaining the PAN and eliminating the risk that of a fraudulent entity using the VCN at any other source.

A user may register a PAN and/or user account for VCN use, as discussed herein. The user may register a PAN for VCN use using an external entity platform, an external entity portal, or a secure entity portal, as discussed herein. Registering for VCN use may also be triggered at a source portal accessed via an external entity platform or an external entity portal. For example, a user may access an event's portal (e.g., an event coordinator portal, a website, an application, etc.) during registration for an event (e.g., a music festival). From the event portal, the user may provide a PAN for VCN generation, where the VCN is to be associated with the event and one or more locations associated with the event. A determination may be made regarding whether a user account or PAN associated with the user is registered for VCN use. For example, the event portal and/or respective servers may communicate with secure entity 206 to determine if a registration authentication associated with the PAN exists. If no account or PAN is registered for VCN use, then the user may be presented an option to register for VCN use. Alternatively, or in addition, if an account of PAN is registered for VCN use, the user may also be presented an option for VCN use for a different account or PAN. The external entity (e.g., event portal) may facilitate the VCN use registration, in accordance with the techniques disclosed herein.

According to implementations of the disclosed subject matter, once an account or PAN is registered for VCN use, a location-specific VCN associated with the PAN may be generated. FIG. 3 depicts a flowchart 300 for generating a VCN based on a certification mechanism identifier and a location identifier. In flowchart 300, a VCN generation request may be received at VCN registration module 206D of secure entity 206 at step 302. VCN registration module 206D may be configured to receive the VCN generation request via external gateway, for example. The VCN generation request may be generated at a source portal or external entity portal (e.g., event portal), as discussed herein.

The VCN generation request may include the PAN or a user account associated with one or more PANs. The VCN generation request may include a registration identifier (e.g., corresponding to a PAN) to be associated with the VCN. The registration identifier may be determined based on an indication or user input selecting a PAN from one or more PANs of a user account that are registered for VCN use. The registration identifier may distinguish one PAN associated with a user account from another PAN associated with the user account. According to an implementation, the VCN generation may be triggered based on communication between a user device and an external device (e.g., a band, an electronic device, a keycard, etc., as further discussed herein). The external device may be associated with an event and may be used during the event for user identification, transactions, and/or the like. For example, a user may use a user device to pair a user account with the external device. Based on the pairing, a VCN generation request may be generated. According to an implementation, location information may be determined based on the location of the user device at the time the user device communicates with the external device (e.g., when the user device is paired with the external device at the location of an event for which the VCN is generated). Alternatively, according to an implementation, location information may be determined based on the location of the external device at the time the user device communicates with the external device (e.g., when the user device is paired with the external device at the location of an event for which the VCN is generated).

The VCN generation request may further include a location identifier. For example, a user may provide location information to associate with the VCN. The location information may be a geographical location, an address, GPS coordinates, or the like, and may identify a location, event, venue, building, etc. Alternatively, the location information may be provided as event information (e.g., an event name, a venue, an event type, etc.). The event information may be used to generate a location identifier, as further discussed herein. The event information may be provided by an external entity 202, such an event coordinator. For example, a user may indicate that the VCN generation request is associated with a given event. The location associated with the given event may be received or determined based on the event name, an event identifier, a search (e.g., a database search) for the event, etc.

As an illustrative example, a user may access a secure entity portal 206C and request VCN generation. The user may provide location information associated with the VCN generation request via the secure entity portal 206C. Alternatively, the user may input event information secure entity portal 206C and secure entity portal 206C may request location information associated with the event from a database (e.g., online database). The user may be presented one or more selectable options to select a location or event based on the results of the request for location information. The user may select the location or event and location information may be generated based on the selection.

According to implementations of the disclosed subject matter, a location area may be determined. The location area may be, for example, an area, a radius, a diameter, a proximity, a distance, or the like or a combination thereof. The location area may be provided by a user (e.g., via user input) or may be determined automatically (e.g., by the secure entity). For example, the user may provide a venue for an event associated with the VCN generation. The secure entity may determine a location area that encompasses the geographical boundaries of the venue. As another example, an event type (e.g., music festival, sporting event, conference, etc.) may be determined or provided by the user. The event type may be used to determine a location area based on predetermined location areas associated with the event type, based on past event types, using a location area machine learning model, and/or the like.

A location area machine learning model may be trained based on historical or simulated locations, events, location areas, and/or the like. The location area machine learning model may be configured to receive, as inputs, one or more of an event, an event type, a location, a venue, or the like. The location area machine learning model may be configured to output a location area based on the inputs, where the location area may be a location area type such as a radius, a diameter, a proximity, a distance, or the like or a combination thereof. The location area type and the value associated with the location area type (e.g., the location area) may be determined based on the inputs and the trained location area machine learning model. For example, the location area for a music festival event type may be determined to be approximately 0.25 miles from a central coordinate associated with the location of the music festival. As another example, the location area for a music festival event type at a given venue may be the boundaries of the venue.

A location identifier may be generated based on the location and/or the location area. The location identifier may identify the location and may also include an indicator indicating the location area. For example, the location identifier may be a cryptographic value that, when decrypted, identifies the location and/or location area. According to an implementation, the location identifier may include a field for identifying the location and another field for identifying the location area associated with the location.

The location identifier may be identified from a group of potential location identifiers based on correlating event data associated with multiple potential events to information associated with event identified by the user. The event data may include an event name, event type, event location, event coordinator information, event time, etc. For example, database 206A may include the group of potential location identifiers and associated information for each of the group of potential location identifiers. The one or more event data may be compared to associated information for each of the group of potential location identifiers. Based on the comparison, a location identifier may be identified if a match exists between the one or more event data and the associated information for each of the group of potential location identifiers.

According to an implementation, a comparison score may be generated for all or a subset of the group of potential location identifiers. The comparison score may indicate the likelihood that a given location identifier corresponds to a given one of the group of potential location identifiers. The comparison score may be based on an overlap or correlation between the event data and the associated information for respective potential location identifiers. A potential location identifier with the highest comparison score may be identified as a likely potential location based on the one or more event data. The comparison score for the likely potential event may be compared to a comparison score threshold. If the comparison score for the likely potential location meets or exceeds the comparison score threshold, then the location identifier for the likely potential event may be identified as associated with the one or more event data.

According to an implementation, an identifier machine learning model may be trained to output the comparison score. The identifier machine learning model may receive, as inputs, the one or more event data and the associated information for each of the group of potential location identifiers. Based on the inputs, the identifier machine learning model may output a plurality of comparison scores and/or the highest comparison score and an indication of which location identifier corresponds to the highest comparison score.

The VCN generation request may further include external risk signals associated with the VCN generation request. The external risk signals may be similar to the external risk signals discussed herein in reference to the VCN registration request and may be generated by external entity 202 (e.g., event coordinator) or secure entity 206.

At step 304, a VCN may be generated (e.g., at secure entity 206 via VCN generator 206F). The VCN may be generated based on the PAN and the location identifier. The VCN may be associated with both the PAN and the location identifier such that the VCN may only be used at a location corresponding to the location identifier. The VCN may be stored at database 206A and the location and location area associated with the location identifier may be relationally correlated with the VCN.

The VCN generated at step 304 may be provided from secure entity 206 to external entity 202 (e.g., event coordinator), a user device, and/or an external device, as further discussed herein. External entity 202 may receive the VCN and may associate the VCN with an external entity user account. Accordingly, the external entity may provide the VCN as a certification mechanism option when the user initiates a transaction at a location associated with the location identifier.

As an illustrative example, the VCN generated at step 304 may be associated with the PAN such that the user may provide the VCN instead of the PAN when conducting a transaction (e.g., a transaction at a location associated with the location identifier). The VCN may be associated with a user account (e.g., a digital payment account). The VCN may be stored at a user device (e.g., a user's mobile phone) such that the user device may provide the VCN for conducting a transaction. The VCN may be associated with an event user account (e.g., an account associated with the user for use during a music festival). Accordingly, transactions initiated using the event user account (e.g., at the given event) may utilize the VCN. The VCN may be stored at an external device such as a band, an electronic device, a keycard, a near field communication (NFC), a radio-frequency identifier (RFID) device, etc. The external device may be associated with the event user account such that a user may use the external device at the given event to initiate transactions.

According to implementations of the disclosed subject matter, once a VCN corresponding to a given PAN and a given location identifier has been generated, the VCN may be used to conduct transactions at the location associated with the location identifier. A user may use user device 105, an event user account, and/or an external device to conduct a transaction at a transaction location. For example, a user may initiate a transaction via a point of sale source device for a source selling a good at an event. The user may, for example, select the VCN using user device 105 to conduct the transaction.

At step 306 of FIG. 3, a VCN use request may be received from a source entity for a VCN based transaction. For example, secure entity 206 may receive a VCN use request based on the user initiating a transaction using the VCN at the given source. Based on the VCN use request, a VCN source verification process may be initiated at secure entity 206. The VCN use request may include the VCN and transaction data associated with the VCN use request.

At step 308, use location data associated with the VCN request may be received. The location data may be received as part of the VCN use request at step 306 or may be received separately from the VCN use request. For example, the transaction data may include location data associated with the location of the transaction (e.g., the location associated with a point of sale source device associated with the source). According to an implementation, a portion of the transaction data may be generated by a payment processor such as, but not limited to a certification card processing institution, a banking institution, or the like.

The use location data may be generated based on one or more of a physical location (e.g., a sensed or detected location) associated with the transaction and may be determined based on transaction data, user device data, external device data, source device data and/or the like. Transaction data may include a location identifier or other information indicating the location where a transaction is initiated. The use location data may be based on one or more of a predetermined location associated with a point of sale source device, a source location (e.g., at a given venue), and/or the like. User device data may include location information of a user device used to authorize the transaction. The user device data may be based on one or more of satellite communication data (e.g., provide by a GPS sensor associated with the user device), a triangulation (e.g., cellular triangulation), LAN information for a local connection (e.g., a Wi-Fi connection), location positioning, and/or other applicable sensor based location information or device location information. External device data may be associated with, for example, an external device (e.g., a band, an electronic device, a keycard, a NFC device, a RFID device, etc.) associated with a user account or user for a given event or venue. External device data may be based on one or more of satellite communication data (e.g., provide by a GPS sensor associated with the user device), a triangulation (e.g., cellular triangulation), LAN information for a local connection (e.g., a Wi-Fi connection), location positioning, and/or other applicable sensor based location information or device location information. Source device data may be associated with a point of sale source device used to conduct the transaction. Source device data may be based on one or more of satellite communication data (e.g., provide by a GPS sensor associated with the user device), a triangulation (e.g., cellular triangulation), LAN information for a local connection (e.g., a Wi-Fi connection), location positioning, and/or other applicable sensor data based location information or device location information. As discussed herein, sensor data may be any data provided by or generated based on a sensor and/or sensor reading such as by a location sensor (e.g., GPS sensor, band sensor, electronic device sensor, keycard sensor, NFC sensor, RFID sensor, triangulation sensor, LAN sensor, location sensor, etc.) discussed herein.

The use location data may be one or more of coordinates (e.g., GPS coordinates), distance from coordinates, a venue associated with a location, or the like. The use location data may be encrypted and may be decrypted at secure entity 206.

At step 310, the use location data received at step 308 may be compared to the geographical location associated with the VCN. The use location data may be compared to the location information and the location area associated with the location identifier received at step 302. A determination may be made whether the use location data received at step 308 matches with the location information and/or location area associated with the location identifier.

For example, the coordinates associated with use location data may be compared to the coordinates associated with the location information of the location identifier. The comparison may include determining whether the use location data matches the location information. Additionally, the comparison may include determining whether the use location data is within the location area of the location information associated with the location identifier. For example, a determination may be made whether the use location data associated with a transaction is within the radius of the location information as identified by the location area.

At step 312, a VCN use authorization may be provided based on the comparison at step 310. The VCN use authorization may be provide if the use location data associated with a transaction matches the location information associated with the location identifier. Alternatively, or in addition, the VCN use authorization may be provided if the use location data is within the location area of the location information associated with the location identifier. For example, at step 312, location information associated with a given VCN may include a set of GPS coordinates and a location area may provide 500 feet radius. A VCN use authorization may be provided if the location use data associated with a transaction is within 100 feet from the GPS coordinates.

Alternatively, at step 312, a VCN use denial may be provided based on the comparison at step 310. The VCN use denial may be provide if the use location data associated with a transaction does not match the location information associated with the location identifier. Alternatively, or in addition, the VCN use denial may be provided if the use location data is not within the location area of the location information associated with the location identifier. For example, at step 312, location information associated with a given VCN may include a set of GPS coordinates and a location area may provide 500 feet radius. A VCN use denial may be provided if the location use data associated with a transaction is approximately 800 feet from the GPS coordinates.

In accordance with the techniques disclosed herein, a location-based VCN may be associated with a given location and location area. Transactions that match with the given location or location area may be authorized, whereas transactions that do not match the given location or location area may be denied. Accordingly, VCN use for a location-based VCN may be limited to the location originally authorized by the user when generating the VCN.

Figure 4:
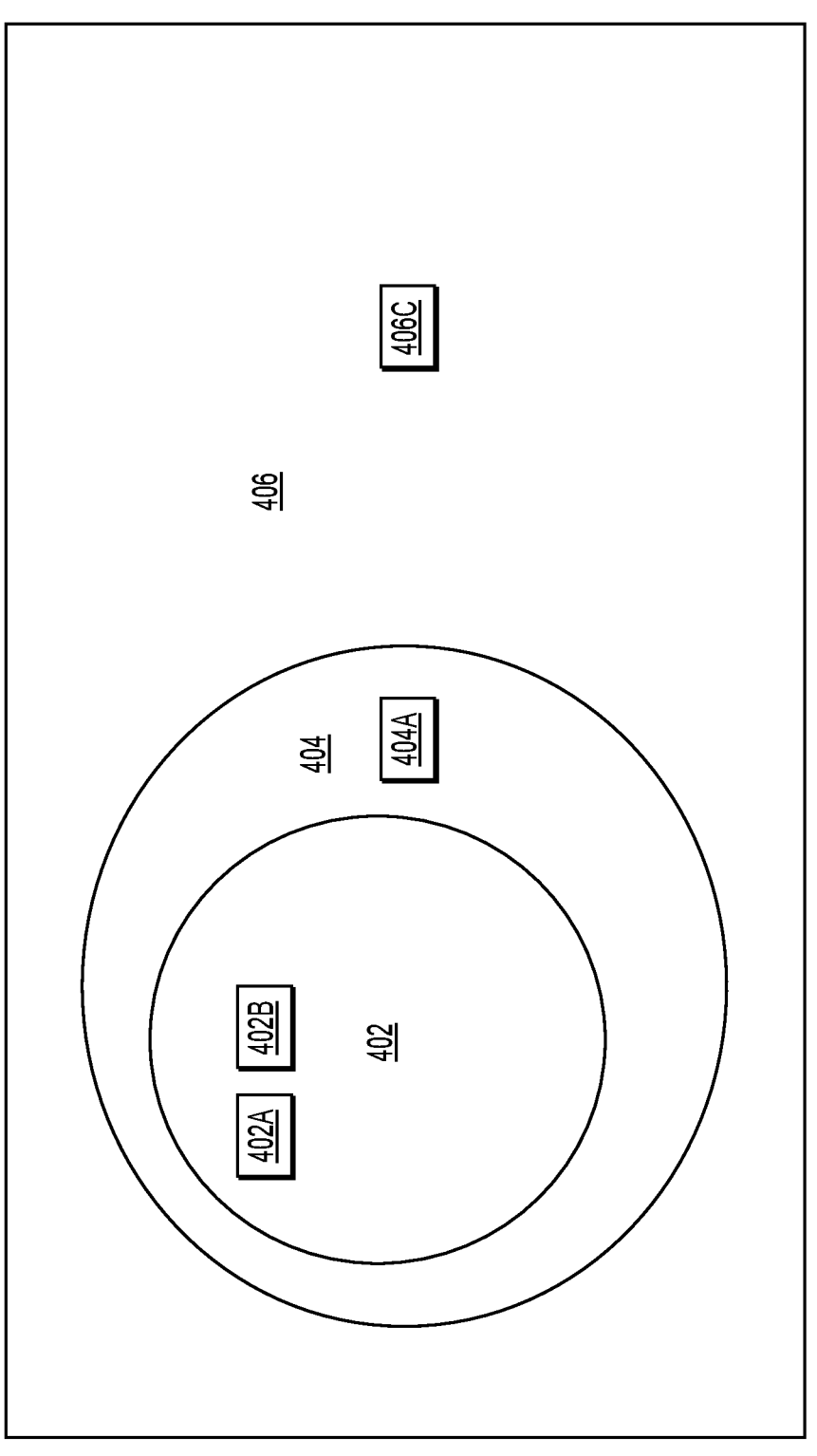
FIG. 4 depicts a diagram for VCN use based on location information, according to one or more embodiments.

FIG. 4 depicts a diagram for VCN use based on location information, according to an implementation of the disclosed subject matter. According to an implementation, the location identifier received at step 302 of FIG. 3 may include a location area that includes one or more location zones, such as location zone 402, location zone 404, and/or location zone 406, as shown in FIG. 4. Each location zone may be associated with respective location-based VCN use such that the VCN generated at step 304 of FIG. 3 may have rules, with applicable rule property or properties, associated with each respective location zone. A location zone may be provided as one or more sets of coordinates, as a distance from a central coordinate, a radius (e.g., measured form a central coordinate), a venue area, or the like. For example, location zone 402 may be most proximate to a central coordinate associated with location information of the location identifier. Point of sale devices 402A and 402B for a first and second source may be located within location zone 402. Location zone 404 may be external to location zone 402 but within a location area for which a VCN is authorized. Point of sale device 404A for a third source may be located within location zone 404. Location zone 406 may be outside the location area for which VCN use is authorized. Although location zone 402, location zone 404, and location zone 406 are shown in FIG. 4, it will be understood that any number of location zones may be associated with a location identifier.

The location zones associated with a VCN may have corresponding location zone rules. According to an implementation, more stringent rules may apply to location zones further away from a central location that the location zones are based on. Location zone rules may be based on one or more of a transaction amount, a source, a source type, a transaction frequency, or the like. For example, location zone 402 may be approved for transactions of any amount, from any source, from any source type, and for any number of transactions. Location zone 404 may be approved for transactions up to $100, for transactions with sources having a trust rating above a trust rating threshold, for transactions with food and beverage sources only, and/or for up to two transactions per day. Location zone 406C may not be approved for any transactions or may be approved for emergency transactions. According to this example, an emergency transaction may be a transaction associated with a vendor having an emergency designation such as a vendor providing first aid material, emergency communication services, transportation services, etc. The emergency designation may be included in transaction data (e.g., having an emergency flag) or may be determined by a machine learning model based on the type of source and/or type of transaction.

According to an implementation of the disclosed subject matter, one or more rules associated with a given VCN may be received. The one or more rules may be received with the VCN generation request at step 302 of FIG. 3. The one or more rules may be automatically generated by external entity 202, secure entity 206, and/or may be provided based on user input. The rule may dictate use of one or more VCNs associated with a user such as, for example, maximum transaction amounts, type of source, frequency of use, or the like. Accordingly, a VCN generated in accordance with techniques disclosed herein may be associated with the one or more rules. When VCN use is triggered, as disclosed herein (e.g., at step 306 of FIG. 3), the VCN use may be filtered using the one or more rules such that use of the VCN may be allowed or blocked (e.g., at step 312) further based on the rule. The one or more rules discussed herein may be implemented at external entity 202 or secure entity 206.

According to an implementation of the disclosed subject matter, one or more time values associated with a given VCN may be received. The one or more time values may be received with the VCN generation request at step 302 of FIG. 3. The one or more time values may be automatically generated by external entity 202, secure entity 206, and/or may be provided based on user input. According to an implementation, the one or more time values may be automatically determined based on times associated with an event. Time values based on times associated with an event may include a buffer (e.g., a given amount of time before and/or after the times associated with the event). The buffer may be determined based on a machine earning model configured to output the buffer based on historical events (e.g., historical events matching a profile of a given event)

or simulated events. The time values may dictate use of one or more VCNs associated with a user such as, time of transaction, time of event, and/or the like. Accordingly, a VCN generated in accordance with techniques disclosed herein may be associated with the one or more time values. When VCN use is triggered, as disclosed herein (e.g., at step 306 of FIG. 3), the VCN use may be filtered using the one or more time values such that use of the VCN may be allowed or blocked (e.g., at step 312) further based on the time values and the time associated with a transaction.

Figure 5:
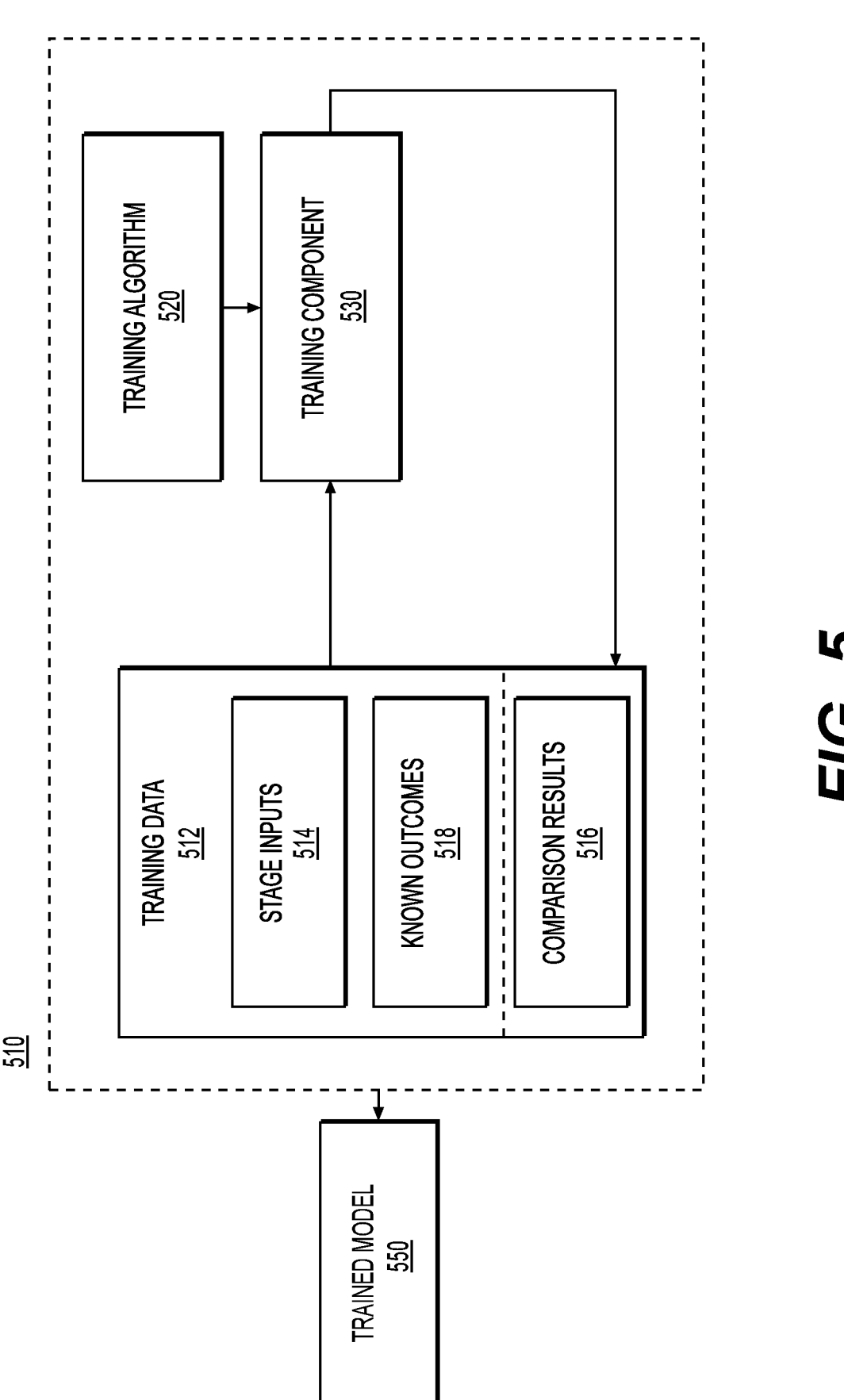
FIG. 5 depicts a flow diagram for training a machine learning model, according to one or more embodiments.

As disclosed herein, one or more implementations disclosed herein may be applied by using a machine learning model. A machine learning model as disclosed herein may be trained using one or more components or steps of FIGS. 1-4. As shown in flow diagram 510 of FIG. 5, training data 512 may include one or more of stage inputs 514 and known outcomes 518 related to a machine learning model to be trained. The stage inputs 514 may be from any applicable source including a component or set shown in the figures provided herein. The known outcomes 518 may be included for machine learning models generated based on supervised or semi-supervised training. An unsupervised machine learning model might not be trained using known outcomes 518. Known outcomes 518 may include known or desired outputs for future inputs similar to or in the same category as stage inputs 514 that do not have corresponding known outputs.

The training data 512 and a training algorithm 520 may be provided to a training component 530 that may apply the training data 512 to the training algorithm 520 to generate a trained machine learning model 550. According to an implementation, the training component 530 may be provided comparison results 516 that compare a previous output of the corresponding machine learning model to apply the previous result to re-train the machine learning model. The comparison results 516 may be used by the training component 530 to update the corresponding machine learning model. The training algorithm 520 may utilize machine learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, and/or discriminative models such as Decision Forests and maximum margin methods, or the like. The output of the flow diagram 510 may be a trained machine learning model 550.

A machine learning model disclosed herein may be trained by adjusting one or more weights, layers, and/or biases during a training phase. During the training phase, historical or simulated data may be provided as inputs to the model. The model may adjust one or more of its weights, layers, and/or biases based on such historical or simulated information. The adjusted weights, layers, and/or biases may be configured in a production version of the machine learning model (e.g., a trained model) based on the training. Once trained, the machine learning model may output machine learning model outputs in accordance with the subject matter disclosed herein. According to an implementation, one or more machine learning models disclosed herein may continuously update based on feedback associated with use or implementation of the machine learning model outputs.

It should be understood that embodiments in this disclosure are exemplary only, and that other embodiments may include various combinations of features from other embodiments, as well as additional or fewer features.

In general, any process or operation discussed in this disclosure that is understood to be computer-implementable, such as the processes illustrated in the flowcharts disclosed herein, may be performed by one or more processors of a computer system, such as any of the systems or devices in the exemplary environments disclosed herein, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices disclosed herein. One or more processors of a computer system may be included in a single computing device or distributed among a plurality of computing devices. A memory of the computer system may include the respective memory of each computing device of the plurality of computing devices.

Figure 6:
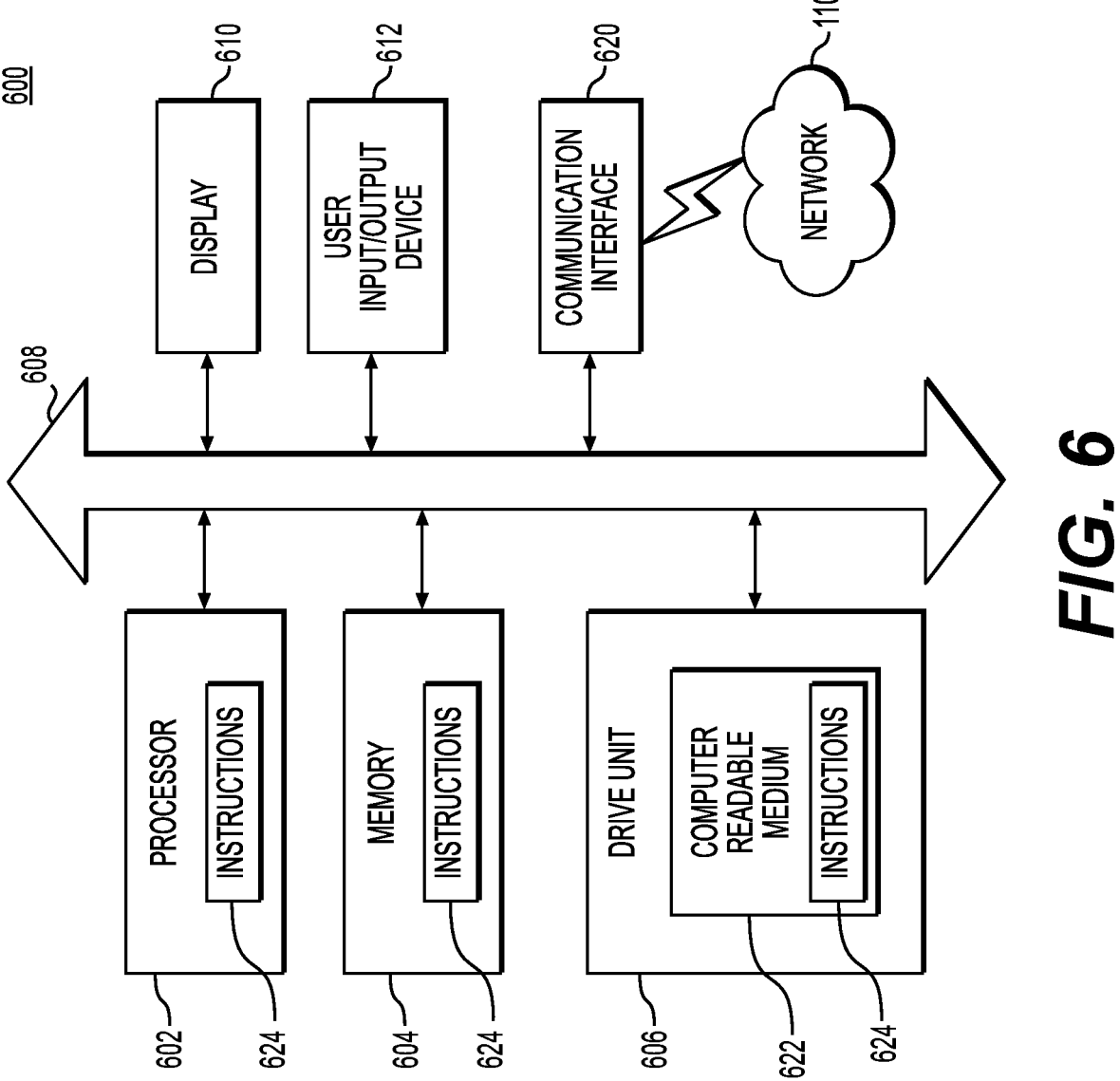
FIG. 6 depicts an example of a computing device, according to one or more embodiments.

FIG. 6 is a simplified functional block diagram of a computer 600 that may be configured as a device for executing the methods disclosed here, according to exemplary embodiments of the present disclosure. For example, the computer 600 may be configured as a system according to exemplary embodiments of this disclosure. In various embodiments, any of the systems herein may be a computer 600 including, for example, a data communication interface 620 for packet data communication. The computer 600 also may include a central processing unit ("CPU") 602, in the form of one or more processors, for executing program instructions. The computer 600 may include an internal communication bus 608, and a storage unit 606 (such as ROM, HDD, SDD, etc.) that may store data on a computer readable medium 622, although the computer 600 may receive programming and data via network communications. The computer 600 may also have a memory 604 (such as RAM) storing instructions 624 for executing techniques presented herein, although the instructions 624 may be stored temporarily or permanently within other modules of computer 600 (e.g., processor 602 and/or computer readable medium 622). The computer 600 also may include input and output ports 612 and/or a display 610 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A method for secure virtual certification number (VCN) use, the method comprising:
   receiving a location-based VCN generation request comprising a primary account number (PAN) and a location identifier;
   generating a location-based VCN based on the PAN and the location identifier, the location-based VCN being associated with limited to a geographical location corresponding to the location identifier, such that the location-based VCN is configured to be (i) denied if used outside the geographical location corresponding to the location identifier and (ii) authorized if used within the geographical location corresponding to the location identifier;
   receiving a VCN use request from an external entity, the VCN use request comprising the location-based VCN;
   receiving a use location data associated with the VCN use request;
   comparing the use location data to the geographical location associated with the location-based VCN; and
   providing one of a VCN use authorization or a VCN use denial based on comparing the use location data to the geographical location.

2. The method of claim 1, wherein the use location data is generated based on sensor data from a sensor of a user device.

3. The method of claim 2, further comprising:
   triggering the VCN use request based on communication from the user device to an external device associated with the external entity; and
   receiving the sensor data from the sensor of the user device in response to triggering the VCN use request.

4. The method of claim 1, wherein the use location data is generated based on sensor data from a sensor of an external device associated with the external entity.

5. The method of claim 4, further comprising:
   triggering the VCN use request based on communication from a user device to the external device; and
   receiving the sensor data from the sensor of the external device in response to triggering the VCN use request.

6. The method of claim 1, wherein the use location data is based on a physical location of one of a user device or an external device associated with the external entity, as determined by a location sensor configured to detect the physical location of the one of the user device or the external device.

7. The method of claim 6, wherein the location sensor is configured to detect the physical location of the one of the user device or the external device based on one or more of a satellite communication, a triangulation, or a location positioning.

8. The method of claim 1, wherein the VCN use request further comprises transaction data and further comprising:
   mapping the transaction data to a point of sale source device having source device data comprising point of sale source device location information;
   comparing the source device location information to the geographical location; and
   providing the one of the VCN use authorization or the VCN use denial further based on comparing the source device location to the geographical location.

9. The method of claim 1, wherein the location-based VCN generation request further comprises a time value and further comprising:

receiving a timestamp associated with the VCN use request;
   comparing the time value to the timestamp; and
   providing the one of the VCN use authorization or the VCN use denial further based on comparing the time value to the timestamp.

10. The method of claim 1, wherein the location-based VCN generation request further comprises a rule and further comprising:
   receiving transaction data associated with the VCN use request;
   extracting a rule property associated with the rule from the transaction data;
   comparing the rule property to the rule; and
   providing the one of the VCN use authorization or the VCN use denial further based on comparing the rule property to the rule.

11. A method for secure virtual certification number (VCN) use, the method comprising:
   receiving a VCN use request from an external entity, the VCN use request comprising a location-based VCN generated based on a primary account number (PAN) and associated with a geographical location;
   receiving a use location data associated with the VCN use request;
   comparing the use location data to the geographical location associated with the location-based VCN, the location-based VCN being limited to a geographical location corresponding to a location identifier, such that the location-based VCN is configured to be (i) denied if used outside the geographical location corresponding to the location identifier and (ii) authorized if used within the geographical location corresponding to the location identifier; and
   providing one of a VCN use authorization or a VCN use denial based on comparing the use location data to the geographical location.

12. The method of claim 11, wherein the location-based VCN is generated based on a location-based VCN generation request comprising the PAN and the location identifier associated with the geographical location.

13. The method of claim 11, wherein the use location data is based on a physical location of one of a user device or an external device associated with the external entity, as determined by a location sensor configured to detect the physical location of the one of the user device or the external device.

14. The method of claim 13, wherein the location sensor is configured to detect the physical location of the one of the user device or the external device based on one or more of a satellite communication, a triangulation, or a location positioning.

15. The method of claim 11, wherein providing one of the VCN use authorization or the VCN use denial is further based on at least one of comparing a VCN source identifier associated with the location-based VCN to a transaction source identifier associated with the VCN use request, comparing a time value associated with the location-based VCN to a timestamp associated with the VCN use request, or comparing a rule associated with the location-based VCN to a rule property associated with the VCN use request.

16. A method for secure virtual certification number (VCN) use, the method comprising:
   receiving, at an external device, an indication to initiate a VCN based transaction with an external entity;
   providing a VCN in response to receiving the indication, the VCN generated based on a VCN generation request comprising a PAN and a location identifier associated with a geographical location, the generated VCN being limited to the geographical location corresponding to the location identifier, such that the generated VCN is configured to be (i) denied if used outside the geographical location corresponding to the location identifier and (ii) authorized if used within the geographical location corresponding to the location identifier;

providing a use location data based on sensor data from a sensor of the external device; and receiving one of a VCN use authorization or a VCN use denial, in response to providing the VCN and the use location data.

17. The method of claim 16, wherein the indication to initiate the VCN based transaction is provided via one of a user input or an interaction between the external device and source device associated with a source.

18. The method of claim 16, further comprising initiating the external device using a user device, the initiating comprising causing the VCN to be stored at the external device.

19. The method of claim 18, wherein the external device is at least one of a wearable device, a near field communication (NFC) device, or an RFID device.

20. The method of claim 16, wherein the sensor is configured to generate the sensor data based on a physical location of the external device based on one or more of a satellite communication, a triangulation, or a location positioning.

\* \* \* \* \*